United States Patent
Lee et al.

(10) Patent No.: US 12,418,012 B2
(45) Date of Patent: Sep. 16, 2025

(54) INSULATING COATING OVERLAY CONTROL SYSTEM AND INSULATING COATING OVERLAY CONTROL METHOD

(71) Applicant: LG Energy Solution, Ltd., Seoul (KR)

(72) Inventors: Chang Hun Lee, Daejeon (KR); Seong Wook Hong, Daejeon (KR); Dong Hun Song, Daejeon (KR); Sang Hoon Choy, Daejeon (KR); Shin Wook Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 45 days.

(21) Appl. No.: 17/914,964

(22) PCT Filed: Nov. 26, 2021

(86) PCT No.: PCT/KR2021/017631
§ 371 (c)(1),
(2) Date: Sep. 27, 2022

(87) PCT Pub. No.: WO2022/119246
PCT Pub. Date: Jun. 9, 2022

(65) Prior Publication Data
US 2023/0170458 A1    Jun. 1, 2023

(30) Foreign Application Priority Data

Dec. 3, 2020  (KR) .................. 10-2020-0167558
Nov. 9, 2021  (KR) .................. 10-2021-0153267

(51) Int. Cl.
*B05C 11/10*    (2006.01)
*B05C 5/02*    (2006.01)
(Continued)

(52) U.S. Cl.
CPC ......... *H01M 4/0404* (2013.01); *B05C 5/0254* (2013.01); *B05C 11/1005* (2013.01);
(Continued)

(58) Field of Classification Search
None
See application file for complete search history.

(56) References Cited

U.S. PATENT DOCUMENTS 8,944,001 B2 *  2/2015  Suriawidjaja ......... B05C 5/0225
                                                     118/323
9,016,235 B2 *  4/2015  Ikagawa ............... B05C 5/0258
                                                     118/323
(Continued)

FOREIGN PATENT DOCUMENTS

CN    105911070 A    8/2016
CN    208449718 U    2/2019
(Continued)

OTHER PUBLICATIONS

International Search Report for PCT/KR2021/017631 mailed Mar. 3, 2022. 3 pgs.

*Primary Examiner* — Binu Thomas
(74) *Attorney, Agent, or Firm* — Lerner David LLP

(57) ABSTRACT

An insulation-coating overlay control system, an electrode plate for a secondary battery, and an insulation-coating overlay control method are provided. The system includes an insulation coater configured to coat an insulating material to allow the insulating material to cover a partial region of a coated part and a non-coated part in an electrode plate along a boundary part. The coated part has an electrode slurry coated thereon and the non-coated part does not have the electrode slurry coated thereon. An insulation-coating width measuring means is configured to measure an overlay width. An insulation coater moving means is configured to move the insulation coater and a controller is configured to control the insulation coater moving means to adjust the overlay width by comparing the measured overlay width (Continued)

with a predetermined overlay width setting range or an overlay width reference value.

10 Claims, 7 Drawing Sheets

(51) Int. Cl.
  *H01M 4/04* (2006.01)
  *H01M 4/13* (2010.01)
  *H01M 4/62* (2006.01)
  *H01M 50/59* (2021.01)
(52) U.S. Cl.
  CPC .............. *H01M 4/13* (2013.01); *H01M 4/62* (2013.01); *H01M 50/59* (2021.01); *B05C 11/1015* (2013.01)

(56) References Cited

U.S. PATENT DOCUMENTS

| | | | | |
|---|---|---|---|---|
| 2011/0249276 A1* | 10/2011 | Minakuchi | ............ | H01M 4/139 356/630 |
| 2016/0111708 A1* | 4/2016 | Miyamoto | ............ | B05C 5/0254 118/300 |
| 2017/0252765 A1* | 9/2017 | Medard | ................ | B05B 12/124 |
| 2018/0351211 A1 | 12/2018 | Kifune | | |
| 2019/0201929 A1 | 7/2019 | Yoon et al. | | |
| 2020/0144657 A1 | 5/2020 | Kifune et al. | | |
| 2022/0134379 A1* | 5/2022 | Lee | ........................ | B05C 5/0254 427/58 |
| 2023/0061532 A1* | 3/2023 | Kuwayama | ............... | B05C 5/02 |

FOREIGN PATENT DOCUMENTS

| | | |
|---|---|---|
| CN | 111479634 A | 7/2020 |
| CN | 111640978 A | 9/2020 |
| JP | 2005235414 A | 9/2005 |
| JP | 2006019199 A | 1/2006 |
| JP | 2018004336 A | 1/2018 |
| JP | 6596107 B2 | 10/2019 |
| KR | 20060110041 A | 10/2006 |
| KR | 20130064853 A | 6/2013 |
| KR | 101285999 B1 | 7/2013 |
| KR | 101387840 B1 | 4/2014 |
| KR | 20160091732 A | 8/2016 |
| KR | 101719694 B1 | 3/2017 |
| KR | 20170112390 A | 10/2017 |
| KR | 20170139463 A | 12/2017 |
| KR | 20190083243 A | 7/2019 |
| KR | 102061057 B1 | 12/2019 |
| KR | 20200016285 A | 2/2020 |
| KR | 20200074613 A | 6/2020 |

* cited by examiner

[FIG. 1]
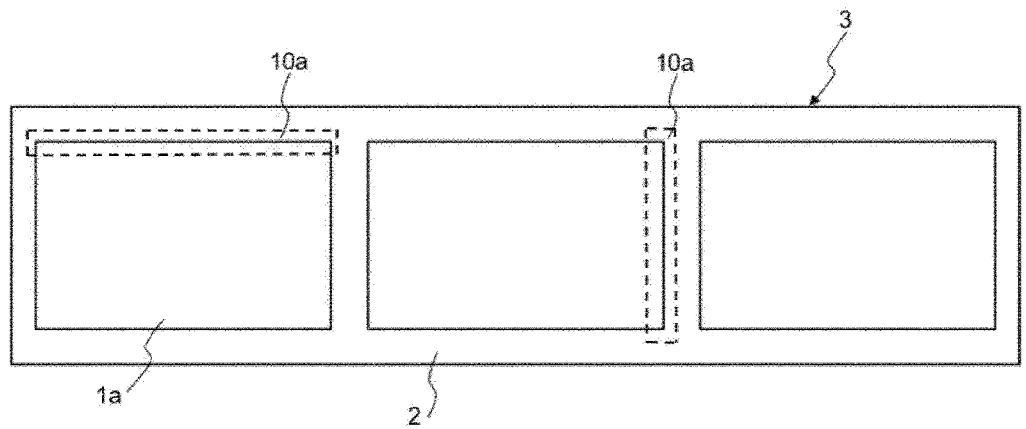

[FIG. 2]
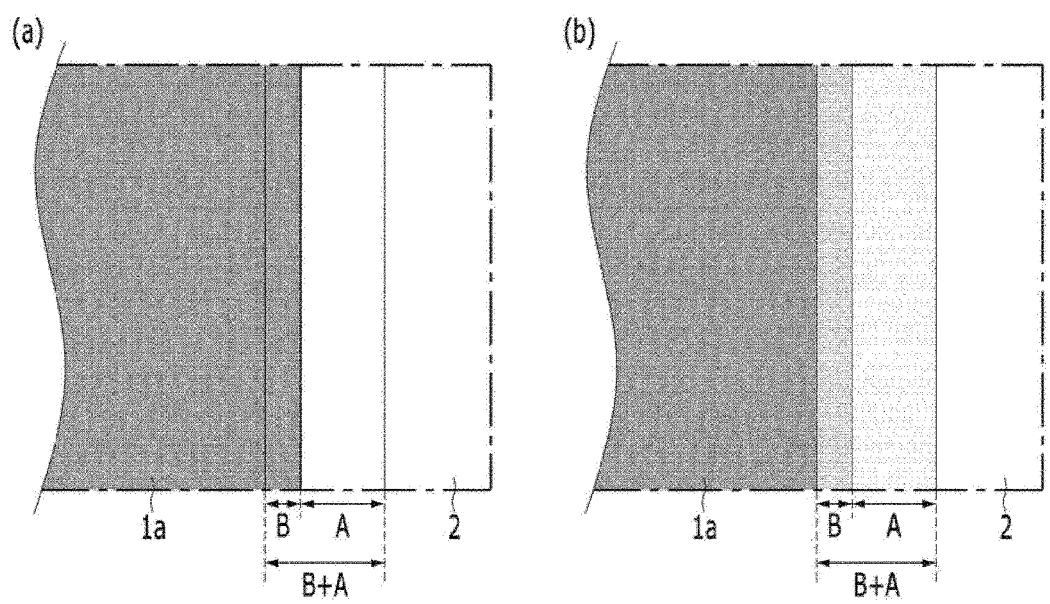

[FIG. 3]
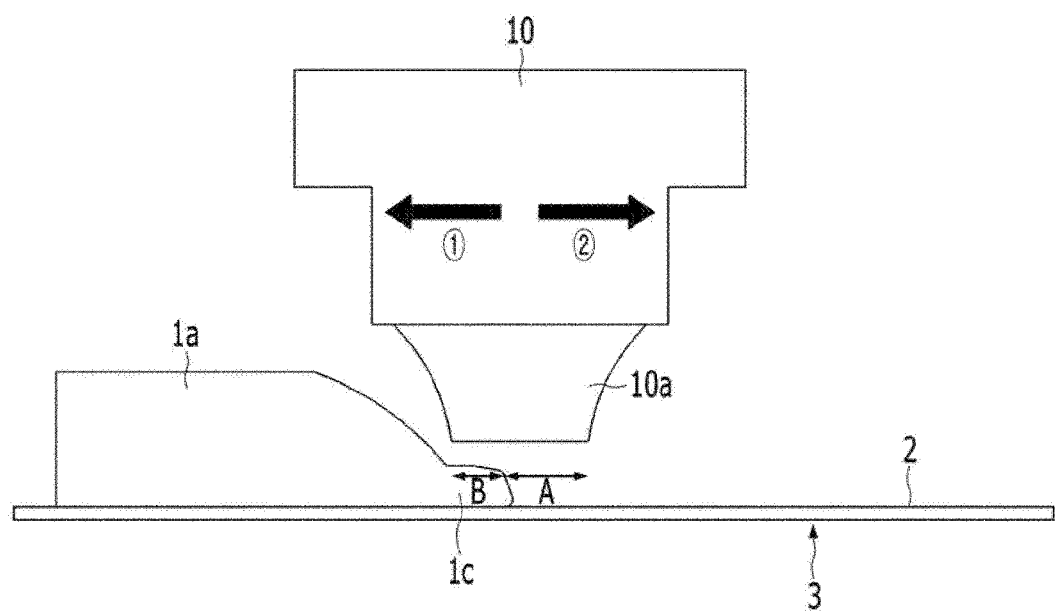

[FIG.4]
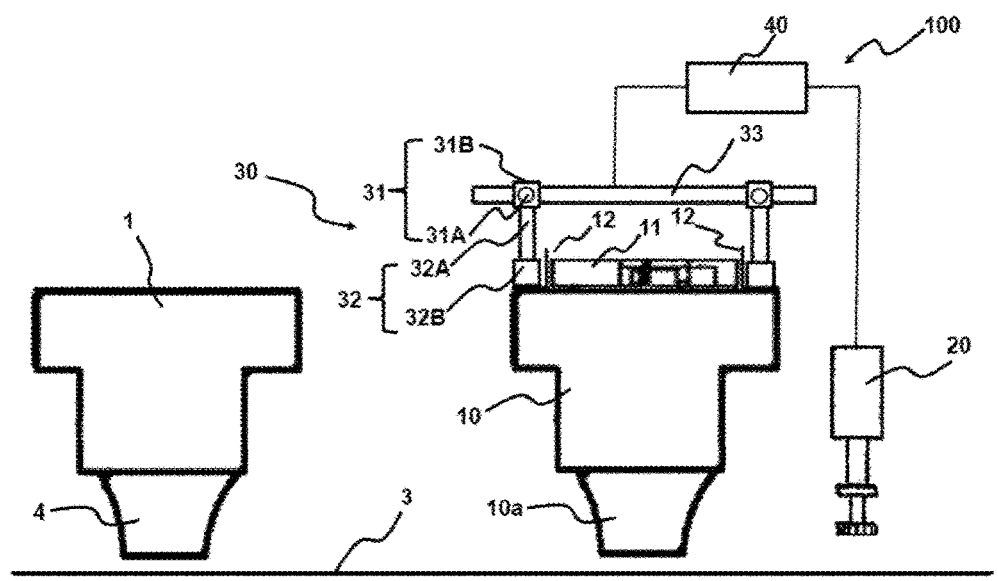
[FIG.5]
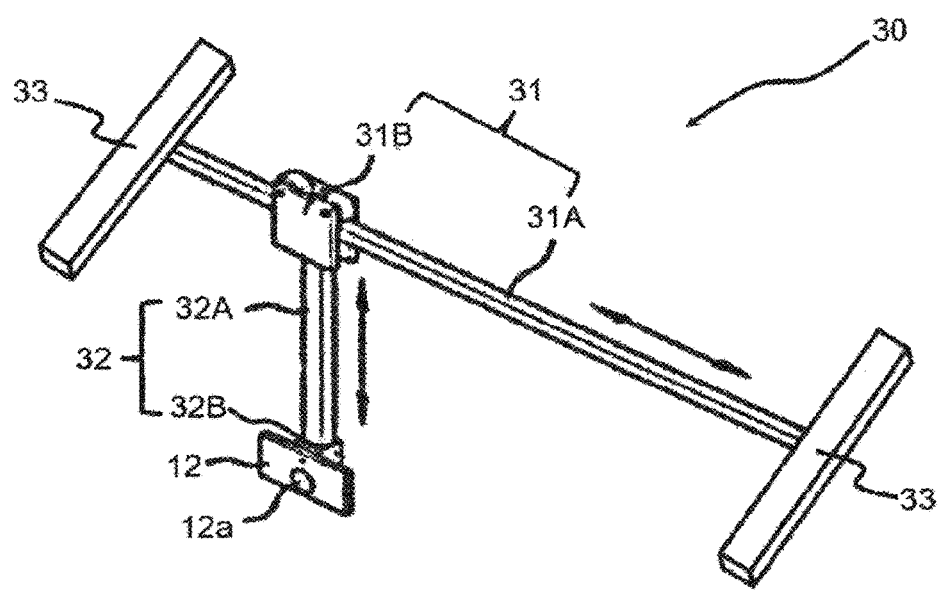

[FIG. 6]
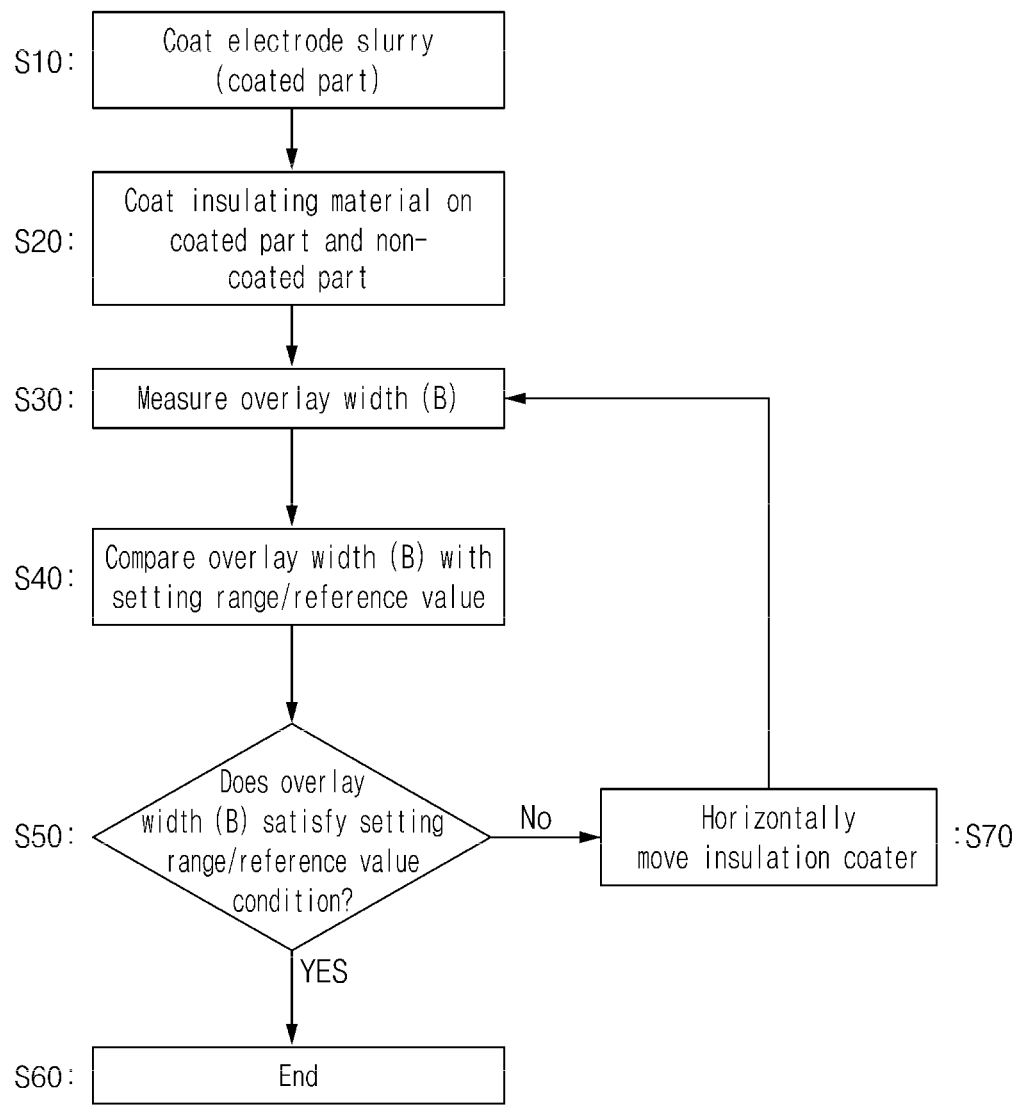

[FIG. 7]
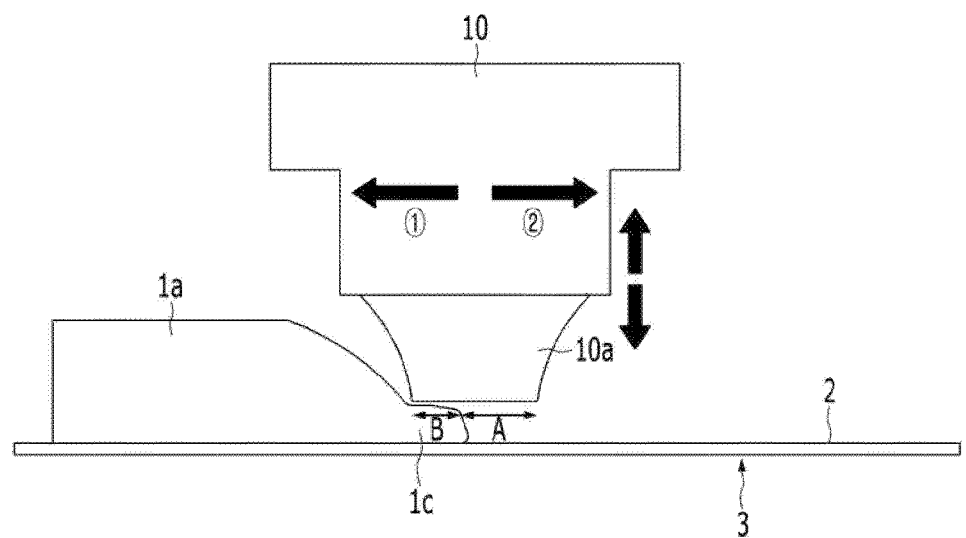

[FIG. 8]
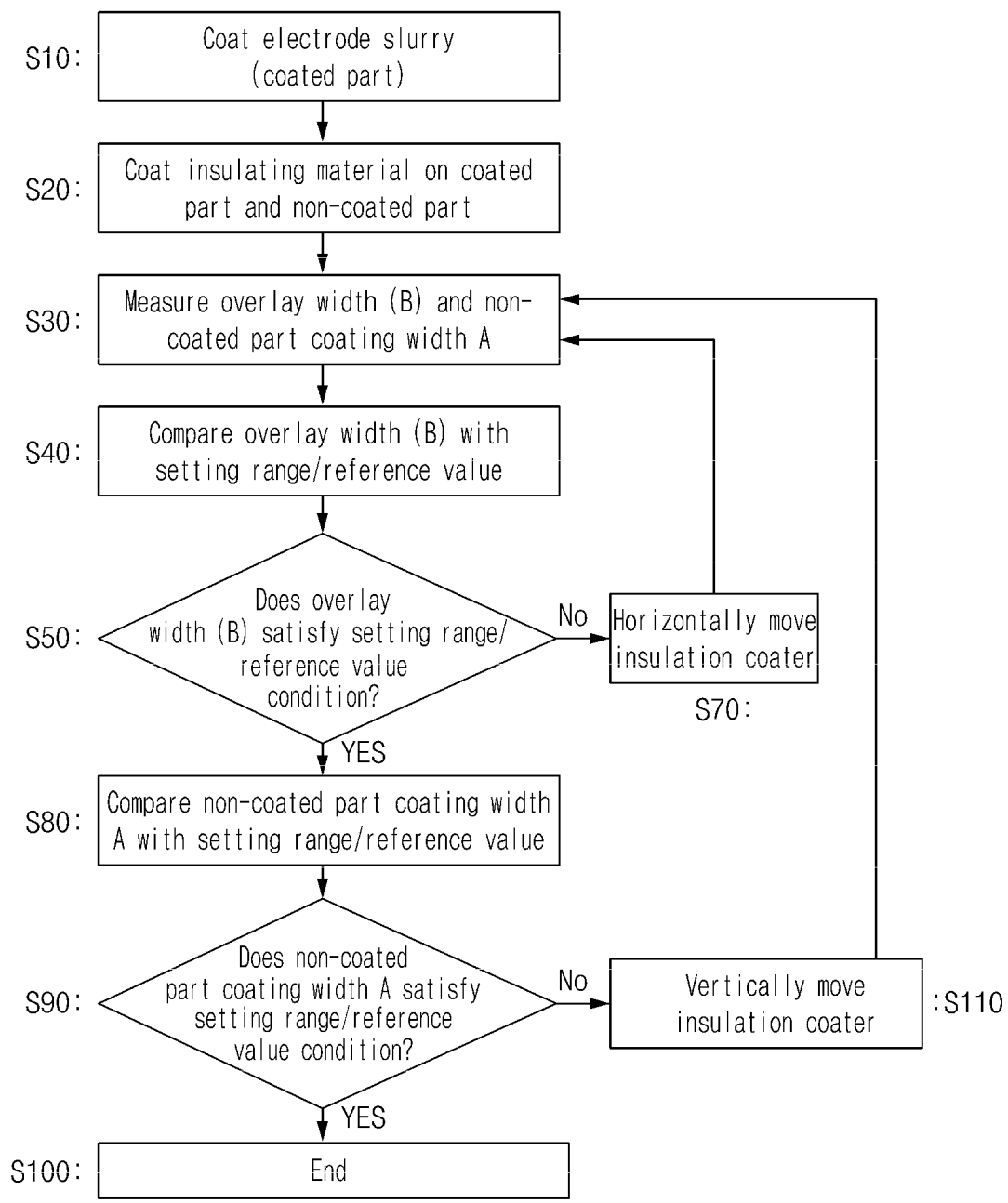

US 12,418,012 B2

INSULATING COATING OVERLAY CONTROL SYSTEM AND INSULATING COATING OVERLAY CONTROL METHOD

CROSS REFERENCE TO RELATED APPLICATIONS

The present application is a national stage entry under 35 U.S.C. § 371 of International Application No. PCT/KR2021/017631 filed on Nov. 26, 2021, which claims priority from Korean Patent Application No. 10-2020-0167558 filed on Dec. 3, 2020 and Korean Patent Application No. 10-2021-0153267 filed on Nov. 9, 2021, the disclosures of which are incorporated herein by reference.

TECHNICAL FIELD

The present invention relates to an insulation-coating control system for controlling the coating width when coating an insulating material on a coated part where an electrode slurry is coated on an electrode plate. More specifically, the present invention relates to an insulation-coating overlay control system for controlling the width of the overlay part, where the coated part and the insulating material coated portion are superposed, to be within a predetermined range or coincide with the predetermined reference value.

The present invention also relates to an electrode plate for a secondary battery, in which an overlay width is uniform along the electrode plate in a predetermined range.

The present invention also relates to an insulation-coating overlay control method for controlling the width of the overlay part.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

One of the major research tasks in these secondary batteries is to improve safety. Battery safety related accidents are closely related with abnormal high temperature conditions due to a short circuit between a positive electrode and a negative electrode. Namely, in a normal situation, a separator is positioned between a positive electrode and a negative electrode, to thereby maintain electrical insulation, but in an abnormal situation where a battery causes overcharge or overdischarge, an internal short circuit occurs due to dendritic growth of an electrode material, or a foreign material, a sharp object such as nail, screws, etc. penetrates a battery, or a battery is deformed by external force, the existing separator is not sufficient.

Further, the separator, which is mainly formed of a microporous membrane made of a polyolefin resin, has a heat resistance temperature of about 120 to 160° C., which is not a sufficient heat resistance. Hence, when an internal short circuit occurs, the separator shrinks due to the short circuit reaction heat and the short circuit occurs in a larger area, which leads to a thermal runaway state where more reaction heat is generated.

Hence, in order to reduce the possibility of a short circuit of the positive electrode and the negative electrode by maintaining the insulation of the battery electrode, an insulating material is generally coated on the portion of the positive electrode.

FIG. 1 is a schematic diagram illustrating a portion where an insulating material (insulating liquid) is coated on an electrode plate (current collector sheet).

A coated part 1a, which is generated by an electrode slurry 4 composed of an active material, a conductive material and a binder, is formed on an electrode plate 3 with a certain pattern. A portion, where the electrode slurry is not coated, becomes a non-coated part 2. What is illustrated in FIG. 1 is one type of pattern, and the coated part 1a—non-coated part 2 pattern may be variously changed according to the type of the battery and the usage, etc. Further, the coated part 1a may be formed on one surface or both surfaces of the electrode plate 3. In FIG. 1, portions marked in a dotted rectangle are portions where the insulating material is coated. Namely, the insulating material is coated along the boundary part of the coated part 1a and the non-coated part 2. Since the non-coated part 2 is a portion to be machined later as an electrode tab, the portion should be coated by an insulating material. FIG. 1 indicates only two dotted rectangles for the convenience of illustration, but the insulating material may be coated on all of the boundary parts of the coated part 1a and the non-coated part 2. Generally, the insulating material is coated at both ends of the coated part 1a in the width direction along the longitudinal direction of the coated part as shown in the left side dotted rectangle of FIG. 1. However, since a tab may sometimes be formed at a non-coated part 2 between coated parts 1a along the longitudinal direction of the coated part according to the type of the battery, the insulating material may be coated along the width direction of the coated part 1a as shown in the right side dotted rectangle of FIG. 1.

FIG. 2 is a view showing a state in which a coated part and a non-coated part have been formed on an electrode plate. FIG. 2 (a) shows a state where a transparent insulating material has been coated, and FIG. 2 (b) shows a state where a translucent insulating material has been coated. As shown in FIGS. 1 and 2, the insulating material is coated to cover a partial region of the coated part 1a and a partial region of the non-coated part 2 along the boundary part of the coated part 1a and the non-coated part 2. Namely, the insulating material is coated to form an overlay coating portion (overlay region) of the coated part 1a and the insulating material in some regions of the coated part 1a. The insulating material is also coated on a certain region on the electrode plate which is a non-coated part 2, which is referred to as a non-coated part coating portion in order to be distinguished from the overlay region. Hereinafter, the width of the overlay region will be referred to as "overlay width B", and the width of the non-coated part coating portion will be referred to as "non-coated part coating width A" for the convenience of explanation. Hence, the entire insulation coating width becomes B+A.

Not only the non-coated part, but also the coated part are insulation-coated to thereby form an overlay region in order to make sure the insulation between electrodes. If only the non-coated part is insulation-coated, there is a possibility that there comes to have an empty space, which is not insulation-coated, between the coated part and the non-coated part.

However, conventionally it was sufficient if the insulating material was superposed on the coated part, and a technology of controlling the width of the overlay region, which was the superposition part, was not developed. As shown in patent document 1, there was a technology of coating an insulating material on an edge to be partly superposed to prevent the exposure of the edge by sensing the edge position of the coated part, but there was no details about how much the coated part and the insulating material are to be superposed and how the superposed width would be adjusted. In the patent document 1, the insulating material is not covered, and accordingly, only the edge, in which the coated part has been exposed, is determined as being defective. As such, in the case that the edge is not exposed by formation of the overlay region where the insulating material is covered on the coated part, it was not determined as being defective.

Likewise, in the past, automatic control of the overlay width was not performed, and it was understood that it was sufficient for the insulating material to be covered on the coated part a little bit according to the worker's feeling. This seemed to be because it was considered that the overlay width gave only a limited influence on the failure or ignition of the battery.

However, recently, as secondary batteries have been ignited for unknown reasons, the overall quality control standard for the battery manufacturing process is gradually strengthened, and the evaluation for the overlay part has become the subject of critical to quality (CTQ), which is an important quality characteristic to customers. For example, if the overlay width B is greater than the predetermined range or reference value, it indicates that the width of the insulating material, which covers the coated part, is large. Since the slurry portion of the coated part covered by the insulating material is limited, compared to the coated part where the lithium movement is not covered, the amount, which contributes to the battery capacity, also becomes small. Further, if the overlay width B is smaller than the setting range or the predetermined reference value, the insulation performance may decrease.

Therefore, there is a need for a technology that can stably control the overlay width from the perspective of battery capacity and battery safety to meet the requirements of the battery.

Prior Patent Document

Patent Document

Korean Patent No. 10-1719694

DISCLOSURE

Technical Problem

The present invention is made to solve the above problems, and an object of the present invention is to provide an insulation-coating overlay control system which can adjust the overlay width of the insulating material coated portion superposed on the coated part to thereby allow the overlay width satisfy the setting range or reference value condition.

Further, another object of the present invention is to provide an insulation-coating overlay control system capable of controlling the non-coated part coating width, which is a width of the insulating material coated on the non-coated part in connection with the adjustment of the overlay width.

Further, an object of the present invention is to provide an electrode plate for a secondary battery, in which the overlay width can be set to be uniform along the electrode plate in a predetermined range by the insulation-coating overlay control system.

Further, another object of the present invention is to provide an insulation-coating overlay control method for controlling the overlay width and the non-coated part coating width.

Technical Solution

An insulation-coating overlay control system of the present invention for solving the above problems includes:
an insulation coater which coats an insulating material to allow the insulating material to cover a partial region of a coated part, on which an electrode slurry has been coated, and a non-coated part, on which the electrode slurry has not been coated, in an electrode plate, along a boundary part between the coated part and the non-coated part; an insulation-coating width measuring means which measures an overlay width, which is a width of an overlay region where the insulating material has been coated on the coated part, and a non-coated part coating width, which is a width of a region where the insulating material has been coated on a non-coated part; an insulation coater moving means which moves the insulation coater; and a controller which controls the insulation coater moving means to adjust the overlay width by comparing the measured overlay width with a predetermined overlay width setting range or an overlay width reference value.

Specifically, the insulation coater moving means may be controlled to move the insulation coater to a coated part side if the measured overlay width is less than the overlay width setting range, and to move the insulation coater to a non-coated part side if the measured overlay width exceeds the overlay width setting range.

Alternatively, the insulation coater moving means may be controlled to move the insulation coater to a coated part side if the measured overlay width is less than the overlay width reference value, and to move the insulation coater to a non-coated part side if the measured overlay width exceeds the overlay width reference value.

In a preferred example, the reference value is a median value corresponding to ½ of the predetermined overlay width setting range, and the insulation coater moving means may be controlled by comparing a median value of the measured overlay width with a median value of the predetermined overlay width setting range.

In one example, the insulation-coating width measuring means may be a vision camera which visually senses the overlay width and the non-coated part coating width.

Specifically, the vision camera may measure the overlay width and the non-coated part coating width by sensing at least one of color, contrast and chroma of the coated part and the non-coated part.

In one example, the insulation coater moving means may allow the insulation coater to be moved horizontally and vertically.

In one example, the controller adjusts the overlay width by controlling a horizontal movement of the insulation coater moving means, the adjusted overlay width is measured again by the insulation-coating width measuring means, and
    it is determined whether to readjust the overlay width by comparing the remeasured overlay width with the predetermined overlay width setting range or overlay width reference value.

In one example, if the measured overlay width is within the predetermined overlay width setting range or coincides with the overlay width reference value, the insulation coater moving means may be controlled to adjust the non-coated part coating width by comparing the measured non-coated part coating width with a predetermined non-coated part coating width setting range or non-coated part coating width reference value.

Specifically, the controller adjusts the non-coated part coating width by controlling a vertical movement of the insulation coater moving means, the non-coated part coating width and the overlay coating width, which have been adjusted according to the vertical movement of the insulation coater moving means, are remeasured by the insulation coating width measuring means, and it is determined whether to readjust the overlay width and the non-coated part coating width by comparing the remeasured overlay width with the predetermined overlay width setting range or the overlay width reference value and comparing the non-coated part coating width with a predetermined non-coated part coating width setting range or a non-coated part coating width reference value.

In another aspect of the present invention, an electrode plate for a secondary battery includes: a coated part where an electrode slurry is coated on an electrode plate; a non-coated part where an electrode slurry is not coated on the electrode plate; and an insulating material coated portion where an insulating material is coated to cover a partial region of the coated part and a partial region of the non-coated part. Herein, an overlay width, which is a width of an overlay region where the insulating material is coated on a partial region of the coated part, is uniform along the electrode plate and is in a range of 0.4 to 0.8 mm.

In further another aspect of the present invention, an insulation-coating overlay control method includes: coating an insulating material to allow the insulating material to cover a partial region of a coated part, on which an electrode slurry has been coated, and a non-coated part, on which the electrode slurry has not been coated, in an electrode plate, along a boundary part between the coated part and the non-coated part; measuring an overlay width, which is a width of an overlay region where the insulating material has been coated on the coated part after coating the insulating material, and a non-coated part coating width, which is a width of a region where the insulating material has been coated on a non-coated part; comparing the measured overlay width with a predetermined overlay width setting range or an overlay width reference value; and adjusting the overlay width by horizontally moving an insulation coater, which is used to coat the insulating material, to the coated part or non-coated part side if the measured overlay width is beyond the overlay width setting range or does not coincide with the overlay width reference value.

In one example, the insulation-coating overlay control method may further include: remeasuring the adjusted overlay width; and determining whether to readjust the overlay width by comparing the remeasured overlay width with the predetermined overlay width setting range or the overlay width reference value.

In another example, the insulation-coating overlay control method may further include: vertically moving the insulation coater to adjust the non-coated part coating width by comparing the measured non-coated part coating width with a predetermined non-coated part coating width setting range or non-coated part coating width reference value if the measured overlay width is within the predetermined overlay width setting range or coincides with the overlay width reference value.

Further, the non-coated part coating width and the overlay coating width, which have been adjusted according to the vertical movement of the insulation coater, are remeasured, and it is determined whether to readjust the overlay width and the non-coated part coating width by comparing the remeasured overlay width with the predetermined overlay width setting range or the overlay width reference value and comparing the non-coated part coating width with a predetermined non-coated part setting coating width setting range or a non-coated part coating width reference value.

Advantageous Effects

According to the present invention, it is possible to improve battery characteristics and prevent battery failure by adjusting the width of the overlay which is the insulating material coated portion which is superposed with the coated part.

Further, according to the present invention, it is possible to efficiently satisfy CTQ which is required by clients by controlling the non-coated part coating width, which is the width of the insulating material coated on the non-coated part in connection with the adjustment of the overlay width.

Further, according to the present invention, it is possible to manufacture an electrode plate for a secondary battery, in which an overlay width is uniform along the electrode plate in a predetermined range.

BRIEF DESCRIPTION OF THE DRAWINGS

FIG. 1 is a schematic diagram illustrating a portion where an insulating material (insulating liquid) is coated on an electrode plate.

FIG. 2 is a view showing a state in which a coated part and a non-coated part have been formed on an electrode plate by applying two kinds of insulating materials.

FIG. 3 is a schematic diagram illustrating the concept of overlay width control according to a first embodiment of the present invention.

FIG. 4 is a schematic diagram illustrating the entire configuration of an insulation-coating overlay control system of the present invention.

FIG. 5 is a perspective view showing the insulation coater moving means of the present invention.

FIG. 6 is a flowchart showing the order of overlay width control according to the first embodiment of the present invention.

FIG. 7 is a schematic diagram illustrating the concept of overlay width control and non-coated part coating width control according to a second embodiment of the present invention.

FIG. 8 is a flowchart showing the order of overlay width and non-coated part coating width control according to the second embodiment of the present invention.

DETAILED DESCRIPTION OF THE PREFERRED EMBODIMENTS

Hereinafter, the detailed configuration of the present invention will be described in detail with reference to the accompanying drawings and various embodiments. Embodiments described below are exemplary to assist in understanding of the present invention, and in order to help understand the invention, the accompanying drawings are not shown as actual scale and the dimensions of some components may be exaggerated.

As the inventive concept allows for various changes and numerous embodiments, particular embodiments will be illustrated in the drawings and described in detail in the text.

However, this is not intended to limit the present invention to the specific form disclosed, and it should be understood to include all changes, equivalents, and substitutes included in the spirit and scope of the present invention.

An insulation-coating overlay control system of the present invention includes: an insulation coater which coats an insulating material to allow the insulating material to cover a partial region of a coated part, on which an electrode slurry has been coated, and a non-coated part, on which the electrode slurry has not been coated, in an electrode plate, along a boundary part between the coated part and the non-coated part; an insulation-coating width measuring means which measures an overlay width, which is a width of an overlay region where the insulating material has been coated on the coated part, and a non-coated part coating width, which is a width of a region where the insulating material has been coated on a non-coated part; an insulation coater moving means which moves the insulation coater; and a controller which controls the insulation coater moving means to adjust the overlay width by comparing the measured overlay width with a predetermined overlay width setting range or an overlay width reference value.

According to the present invention, it is possible to control the overlay width to be within the setting range or fit the predetermined reference value in addition to simply insulation-coating the edge of the coated part. To this end, the present invention provides an insulation-coating width measuring means for measuring the overlay width. Further, the present invention provides a controller for comparing the measured overlay width with a predetermined overlay width setting range or an overlay width reference value. In the present invention, comparing the measured overlay width with the overlay width setting range means that the overlay width will be adjusted to be within the setting range if it goes beyond the setting range. Namely, an object of the present invention is to control the range of the overlay width. Further, in the present invention, comparing the measured overlay width with the overlay width reference value means that the overlay width will be adjusted to coincide with the reference value if the overlay width is different from the reference value. Namely, another object of the present invention is a pinpoint control of the overlay width. Hence, according to the present invention, it is possible to perform both range control of allowing the overlay width to approach the predetermined overlay width and pinpoint control of allowing the overlay width to fit the predetermined reference value.

Further, the present invention also presents feedback control which repeats such range control and pinpoint control. As will be described later, the present invention also presents a technical idea of controlling the overlay width and the non-coated part coating width together in addition controlling the overlay width.

Further, in the present specification, a slot die or a dispenser may be applied to the insulation coater which coats the insulating material. When the slot die is applied, the insulation coater may also be called an insulation die or a die coater. In any case, it should be noted that they are subordinate concepts of the insulation coater.

Hereinafter, the present invention will be described in more detail based on the accompanying drawings and various embodiments.

DETAILED DESCRIPTION OF THE EMBODIMENTS

First Embodiment

FIG. 3 is a schematic diagram illustrating the concept of overlay width control according to a first embodiment of the present invention.

FIG. 3 intuitively shows the positions of an electrode slurry coating portion, which is a coated part 1a, and a non-coated part 2, and an insulation-coated region. The insulating material 10a, which is discharged from the insulation coater 10, is coated on a part of the coated part 10a and the non-coated part 2.

Insulating liquid, which may be used in the present invention, may be a solution containing a polymer made of one or more selected from the group consisting of polybutadiene, polyurethane, polyimide, acetate, polyester, polyphenylene sulfide, polypropylene, styrene-butadiene-based copolymer, (meta) acrylic acid, (meta) acrylate copolymer, polyacrylonitrile, polyvinyl chloride, polyfluoro compound, polyvinyl alcohol, and polycyanoacrylate, or a monomer used for polymerization of polymer of one or more selected from the group consisting of polybutadiene, polyurethane, polyimide, acetate, polyester, polyphenylene sulfide, polypropylene, styrene-butadiene-based copolymer, (meta) acrylic acid, (meta) acrylate copolymer, polyacrylonitrile, polyvinyl chloride, polyfluoro compound, polyvinyl alcohol, and polycyanoacrylate.

Specifically, polyvinylidene fluoride (PVdF)-based insulating liquid, ceramic-based insulating liquid (e.g., aluminum hydroxide-based insulating liquid such as boehmite) may be used.

The insulating liquid may contain one or more solvents selected from the group consisting of water, glycerol, ethylene glycol, propylene glycol, dimethyl sulfoxide, ethylene carbonate, furfuryl alcohol, and methanol.

The coated part 1a forms a flat surface of a constant thickness in the first part, and as it approaches the end, the thickness decreases and a slope is made, and another plane having a smaller thickness is formed at the end 1c contacting the electrode plate. The insulating liquid is coated to cover a certain region of the end, and this portion is an overlay region and the width is indicated as B. Further, the insulating liquid is coated on a certain region of the non-coated part 2, and this portion is called a non-coated part coating portion and the width is indicated by A. Hence, the entire insulation coating width becomes B+A.

Referring to FIG. 2, FIG. 2 (a) shows an insulation coating layer of transparent insulating liquid. FIG. 2 (b) shows a translucent insulation coating layer. Since the insulating liquid of FIG. 2 (a) has low wet adhesive force, there is a possibility of detachment. Since the insulating liquid of FIG. 2 (b) has improved adhesive force, there is a low possibility of detachment, but since it is translucent, it is more difficult to be visually recognized than the insulating liquid of FIG. 2 (a). Namely, if the insulating liquid of FIG. 2 (a) is made to be transparent with color such as yellow color, the overlay width can be easily recognized by the color and transparency, but it is difficult to for the overlay width of the insulating liquid of FIG. 2 (b) to be recognized with only color, and accordingly, contrast, chroma, etc. may also need to be considered in addition to color. In FIG. 2 (b), the overlay width portion becomes light gray, which is darker than that of the non-coated part coating width portion. As such, the overlay width can be recognized by color and contrast. Herein, it is possible to easily recognize the overlay width by figuring out color, contrast and chroma according to the type of the insulating liquid. Namely, since the overlay width can be visually sensed, it is possible to measure the overlay width from a screen taken by a camera by installing, for example, a vision camera.

Further, if the overlay width B is measured, the non-coated part coating width A of the region where the insulating liquid has been coated on the non-coated part may also be easily measured. FIG. 2 shows the end of the electrode slurry and the non-coated part coating width.

Likewise, if the overlay width B is recognized, this can be compared with the setting range of the predetermined overlay width. For example, if the setting range of the overlay width B is in a range of 1.0 to 1.2 mm and the measured overlay width B is 0.9 mm, it indicates that the insulation-coated portion, which overlaps with the coated part 1a, is smaller than the setting range. Hence, it is possible to enlarge the insulation-coated portion by moving the insulation coater to the coated part 1a side. For example, if the insulation coater is moved to the coated part side of the left side of FIG. 3 by 0.1 to 0.3 mm, the overlay width may be within the setting range (movement in (1) direction of FIG. 3).

In the case that the measured overlay width is 1.3 mm, if the insulation coater is moved to the non-coated part side (right side of FIG. 3) by 0.1 mm range (movement in (2) direction of FIG. 3), it may be within the setting range.

Further, in order to more accurately control the overlay width, the measured overlay width can be compared with the predetermined overlay reference value. Namely, if the measured overlay width is 0.9 mm and the reference value is 1.0 mm, the insulation coater may be moved in (1) direction by 0.1 mm. If the measured overlay width is 1.1 mm and the reference value is 1.0 mm, the insulation coater may be moved in (2) direction by 0.1 mm.

As a method of more accurately controlling the overlay width, a median value corresponding to ½ of the predetermined overlay width is set as the reference value, and it may be compared with the median value of the measured overlay width. For example, the measured overlay width is 0.8 mm, and the median value, which is the reference value is 0.5 mm, then the median value of the measured overlay width is 0.4 mm, which is less than the reference value, and accordingly, it can be moved in the (1) direction. In this case, the insulation coater is moved so that the intermediate position of the overlay width is 0.4 mm. If the measured overlay width is 1.2 mm and the median value, which is the reference value, is 0.5 mm, the median value of the measured overlay width becomes 0.6 mm and is greater than the reference value, and accordingly, it can be moved in (2) direction. Likewise, when compared with the measured median value of the overlay width using the median value at the intermediate position of the overlay width as the reference value, the overlay width may be more accurately adjusted, compared to the range control of controlling the overlay width to be within the setting range or using a simple entire width value as the reference value.

The range of the overlay width B, which is usually applicable, can be 0.1 to 1.2 mm depending on the electrode. According to the present invention, the applicable overlay width range can be easily satisfied by the control of the overlay width. However, if the overlay region is formed to have a narrow width of about 0.1 to 0.3 mm, the overlay width less than 0.1 mm may be formed along a longitudinal direction or width direction of the electrode. On the contrary, if the overlay width is controlled to have a relatively large width of 0.9 mm or more, the insulation property is satisfied, but the electrode capacity may drop as the active material of a wide range is insulation-coated. Hence, the overlay width (B) is preferably in the range of 0.4 to 0.8 mm in consideration of the electrode capacity and in order to make sure the insulation and stably secure the overlay width. The overlay width is more preferably in the range of 0.6 to 0.8 mm. If the overlay width of 0.6 to 0.8 mm is uniformly formed between the coated part and the non-coated part along the longitudinal direction or width direction of the electrode, the insulation quality is improved, and the uniformity of the quality may be secured. Since the overlay width was not controlled in the past, the overlay width along the longitudinal direction or width direction of the electrode was not uniform. For example, when the edge portion of the edge was not exposed, the overlay width of 0.1 mm was not regarded as a defect, and accordingly, the overlay width was not uniform and was in the range of 0.1 to 1 mm or more.

The overlay width or the non-coated part coating width is changed during the insulation-coating process because the width itself of the electrode slurry coated on the electrode plate is changed. Namely, in the consecutive slurry coating process like a roll-to-roll process, the height of the electrode plate is also slightly changed due to the tension applied to the electrode plate sheet and the vibration according to the operation of various devices installed on the consecutive production line. Hence, the width of the slurry coated on the electrode plate is also minutely changed along the longitudinal direction or width direction of the electrode plate. Hence, when the overlay width or non-coated part coating width is set to be constant, the overlay width, etc. are changed as the width of the electrode slurry is changed.

Further, the overlay width, etc. may be changed as the insulating liquid coating width itself is changed according to the viscosity, discharge speed, and discharge direction of the insulating liquid, or the physical vibration or the stress applied to the insulation die. Regardless of the reason why the overlay width or non-coated part coating width is changed, according to the present invention, the overlay width may be formed within the predetermined value by measuring the overlay width and controlling the overlay width.

FIG. 4 is a schematic diagram illustrating the entire configuration of an insulation-coating overlay control system 100 of the present invention.

The electrode slurry coater 1 is positioned at the left side of FIG. 4, that is, the upper side of the moving direction (coating direction) of the electrode plate. An insulation coater 10, an insulation-coating width measuring means 20, an insulation coater moving means 30, and a controller 40 are installed at the lower side of the moving direction of the electrode plate.

If an electrode slurry coating layer (coated part) is formed on the electrode plate 3 with the electrode slurry coater 1, the electrode plate is moved to the insulation coater 10 in order to coat the insulating liquid. Alternatively, it is possible that the electrode plate stops, and the electrode slurry coater 1 and the insulation coater 10 move to perform coating.

After the insulating liquid 10a is discharged from the discharge port of the insulation coater 10, and the insulating liquid is coated on a certain region, centering on the boundary between the coated part and the non-coated part, the electrode plate is moved to the insulation-coating width measuring means 20. An entire insulation-coating width is photographed in the insulation-coating width measuring means 20 as shown in FIG. 2. The insulation-coating width measuring means 20 may use a vision camera such as a CCD camera, capable of visually sensing the overlay width B and the non-coated part coating width A. The vision camera may show the overlay width B and the non-coated part coating width A by sensing visual characteristics such as color, contrast and chroma of the coated part 1a and the non-coated part 2.

The vision camera may take the entire insulation-coated portion of FIG. 2 and convert the taken image into visual data. To this end, the vision camera may include a predetermined program storage unit for data conversion and calculation, a calculation unit which converts an actual photographing screen into visual data based on the program and calculates the overlay width B and the non-coated part coating width A indicated as visual data and display the results as numerical values, and a display unit which displays the visual data and the numerical value of the width on a screen. The vision camera transmits such visual data to the controller 40. In some embodiments, the vision camera may include only a camera unit which purely takes the image of the entire insulation-coated portion and transmits digital data about the image to the controller 40, and the program storage unit, the calculation unit and the display unit may be installed at the controller 40.

The controller 40 includes a storage unit which stores a database about the predetermined overlay width setting range or overlay width reference value, and the predetermined non-coated part coating width setting range or non-coated part coating width reference value, a comparison-calculation unit which comparison-calculates values extracted from the database with the measured overlay width, etc., and a determination unit which determines whether to move the insulation coater moving means by a specific distance according to calculation result. The controller 40 also includes a vision camera which is the insulation-coating width measuring means 20, and a transmitting and receiving unit which controls a moving unit 30 of the insulation coater 10 to be described later. According to the calculation result of the comparison-calculation unit, the controller 40 may order the insulation coater moving unit 30 to move the insulation coater 10 by a predetermined distance in order to adjust the overlay width.

FIG. 5 is a perspective view showing the insulation coater moving means 30 of the present invention. The insulation coater moving means 30 of the present invention will be described in detail with reference to FIGS. 4 and 5.

The insulation coater moving means 30 of FIG. 5 includes both an X-axis transfer unit 31 and a Z-axis transfer unit 32 which allow horizontal and vertical movements of the insulation coater 10. The X-axis transfer unit 31, which is a horizontal moving unit, is composed of a horizontal LM guide axis 31A installed at a support, and a horizontal LM guide block 31B which slides along the horizontal LM guide axis 31A. The Z-axis transfer unit 32, which is a vertical moving unit, is composed of a vertical LM guide axis 32A installed at the horizontal LM guide block 31B, and a vertical LM guide block 32B which slides along the vertical LM guide axis 32A. A coupling plate 12, to which a bracket 11 installed on the upper portion of the insulation coater 10, is coupled, is attached on the vertical LM guide block 32B. A coupling hole 12a is formed on the coupling plate 12 to be coupled to the bracket 11 by a coupling member such as a bolt.

FIG. 4 shows a pair of X-axis transfer units 31 and a pair of Z-axis transfer units 32 installed along the support 33, but FIG. 5 shows only one X-axis transfer unit 31 and one Z-axis transfer unit 32 for the convenience of illustration.

In the present embodiment, a 2-axis transfer unit was used as an example, but it is possible to use different examples in which reciprocating transitional motions can be performed in X-axis and Z-axis directions, respectively. Further, it would be easily understood by one of ordinary skill in the art that when such motions are performed, a driving unit such as a linear motor and a controller for controlling the movement of the driving unit are provided. In FIG. 4, the controller 40 may control the driving unit of the insulation coater moving unit 30 to thereby adjust the overlay width.

Further, it is possible to implement a biaxial transfer unit by using a numerical control track and a thermomotor and employing various known mechanical structures such as belt, bearing, bolts, nuts, and ball screw. Since this is a known mechanical coupling scheme, a specific description thereof will be omitted here.

The insulation coater 10, the insulation-coating width measuring means 20, the insulation coater moving means 30 and the controller 40 of FIG. 4 constitute the insulation-coating overlay control system 100 of the present invention.

The method of controlling the overlay width B using the overlay control system 100 will be described in detail with reference to FIG. 6. FIG. 6 is a flowchart showing the order of overlay width control according to the first embodiment of the present invention.

First, in step S10, an electrode slurry 4 is discharged from an electrode slurry coater 1, and the electrode slurry is coated on the electrode plate 3 to thereby form a coated part 1a. The portion, where the coated part is not formed, becomes a non-coated part 2 where the electrode plate is exposed.

Thereafter, in step S20, if the electrode plate 3 is moved to the insulation coater 10, a predetermined insulating material 10a is discharged from the insulation coater so that the insulating material is coated on a certain region of the coated part 1a and a certain region of the non-coated part 2.

In step S30, the overlay width B of the insulating material coated on the electrode plate 3 is measured by the vision camera 20 which is the insulation-coating width measuring means, and numerical value data about the width is transmitted to the controller 40.

In step S40, the controller 40 compares the measured overlay width B with the predetermined overlay width setting range or overlay width reference value extracted from the database of the controller 40.

In step S50, if the measured overlay width B is within the setting range and coincides with the reference value, the process is terminated in step S60. Namely, in this case, the controller does not order the insulation coater 10 to be moved.

When the measured overlay width B does not satisfy the setting range or reference value condition in step S50, the controller 40 horizontally moves the insulation coater 10 to the coated part 1a or non-coated part 2 side by using the insulation coater moving means 30, to thereby adjust the overlay width.

Thereafter, the insulation-coating overlay control system 100 of the present invention may perform feedback control for determining whether the adjusted overlay width is within the setting range or coincides with the reference value. Namely, the overlay width, which is adjusted by the movement of the insulation coater 10, is remeasured by the insulation-coating width measuring means 20 in the step S30, and the remeasured overlay width is compared with the setting range or reference value to determine whether the overlay width is to be readjusted in steps S40 and S50, to thereby move on to step S60 or step S70. Such feedback control may be repeatedly performed at regular intervals along the electrode line. As such, according to the present invention, it is possible to manufacture an electrode plate having a uniform overlay width of 0.4 to 0.8 mm and more preferably 0.6 to 0.8 mm along the longitudinal direction or width direction of the electrode. Namely, according to the present invention, it is possible to manufacture an electrode plate for a secondary battery including: a coated part where an electrode slurry is coated on an electrode plate; a non-coated part where an electrode slurry is not coated on the electrode plate; and an insulating material coated portion where an insulating material is coated to cover a partial region of the coated part and a partial region of the non-coated part. Herein, an overlay width, which is a width of an overlay region where the insulating material is coated on a partial region of the coated part, is uniform along the longitudinal direction or width direction of the electrode plate and is in a range of 0.4 to 0.8 mm.

Second Embodiment

FIG. 7 is a schematic diagram illustrating the concept of overlay width control and non-coated part coating width control according to a second embodiment of the present invention, and FIG. 8 is a flowchart showing the order of overlay width and non-coated part coating width ocontrol according to the second embodiment of the present invention.

In the present embodiment, the non-coated part coating width A is controlled again after the control of the overlay width B. Further, when the overlay width B and the non-coated part coating width A are changed according to the control of the non-coated part coating width A, the feedback control for allowing the widths to be within the setting range or coincide with the reference value is included.

Further, as shown in FIG. 7, if the insulation coater 10 is moved to the coated part 1a or non-coated part 2 side to adjust the overlay width B, the non-coated part coating width A should be within the non-coated part coating width setting range or coincide with the non-coated part coating width reference value. Namely, if the overlay width B satisfies the setting range or reference value condition, the non-coated part coating width A should also satisfy the setting range or reference value condition.

However, as described above, even when the overlay width B satisfies the setting range or reference value condition, the non-coated part coating width A may not satisfy the setting range or reference value condition due to some reasons such as the change of the height of the electrode plate 3 during the roll-to-roll process.

In the second embodiment, in such a case, the non-coated part coating width A is additionally controlled.

What is unique is the present invention is that the non-coated part coating width A is achieved by vertically moving the insulation coater moving means 30. This is because the overlay width B is changed again if adjusted horizontally again after adjusting the overlay width B by moving the insulation coater moving means 30 horizontally.

If the insulation coater moving means 30 is made to ascend and descend vertically, the insulation coater 10 at the lower surface also ascends and descends vertically. The transfer mechanism thereabout has also been described with reference to FIGS. 4 and 5.

If the insulation coater 10 descends, the entire insulation-coating width increases, and the insulation coater 10 ascends, the entire insulation-coating width decreases. As such, the overlay width B and the non-coated part coating width A also are changed. Herein, since the coated part 1a may contact the insulation coater 10 at the time of descent of the insulation coater 10, there is a limit in the descending range. Further, since the ascent/descent control of the insulation coater 10 may also the already adjusted overlay width, it is desirable to be performed within the limited ascent/descent range. In this sense, the ascent/descent control of the insulation coater 10 for adjusting the non-coated part coating width A has a nature of a dependent variable of the horizontal control of the insulation coater 10 for adjusting the overlay width B. Namely, if the overlay width is significantly changed by the vertical movement control of the insulation coater 10, the technical meaning of the vertical movement control decreases. Hence, the vertical movement range should be limited within a level which satisfies the setting range and reference value condition.

A method of adjusting the overlay width B and the non-coated part coating width A together will be described with reference to FIG. 8.

First, in steps S10 to S50, steps of measuring the overlay width B to control the overlay width and comparing the measured value with the predetermined overlay width setting range or the reference value are the same.

Herein, if the measured overlay width B satisfies the setting range or reference value condition in step S50, the measured non-coated part coating width A is compared with the predetermined non-coated part setting coating width or the non-coated part coating width reference value in step S80. If it is determined that the measured non-coated part coating width A satisfies the predetermined non-coated part setting coating width or non-coated part coating width reference value condition in step S90, the control is terminated in step S100.

If the measured overlay width B does not satisfy the setting range or reference value condition in step S50, the overlay width is adjusted by the horizontal movement of the insulation coater 10 in step S70, and the process returns to step S30 of measuring the overlay width again.

If the overlay width satisfies the setting range or reference value condition in the first step S50 or in the step S50 after adjusting the overlay width, the measured non-coated part coating width A is compared with the predetermined non-coated part setting coating width or non-coated part coating width reference value in step S80.

If it is determined that the measured non-coated part coating width A does not satisfy the predetermined non-coated part setting coating width or the non-coated part coating width reference value condition in step S90, the insulation coater moving means 30 allows the insulation coater 10 to ascend or descend to thereby adjust the non-coated part coating width, in step S110.

Thereafter, by returning to step S30, the adjusted overlay width and non-coated part coating width are remeasured, and the horizontal movement control of the overlay width and the vertical movement control of the non-coated part coating width are repeated. If both the overlay width and the non-coated part coating width satisfy the setting range or reference value condition through the repeated process, the control is terminated, and if any one of them does not satisfy the condition, the feedback control may be repeated until satisfying the setting range or reference value condition.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

1: electrode slurry coater
1a: coated part
1c: end of coated part
2: non-coated part 3: electrode plate
4: electrode slurry
10: insulation coater
10a: insulating material
11: bracket
12: coupling plate
20: insulation-coating width measuring means
30: insulation coater moving unit
31: X-axis transfer unit
31A: horizontal LM guide axis
31B: horizontal LM guide block
32: Z-axis transfer unit
32A: vertical LM guide axis
32B: vertical LM guide block
33: support
40: controller
100: insulation-coating overlay control system
A: non-coated part coating width
B: overlay width

The invention claimed is:

1. An insulation-coating overlay control system comprising:
 an insulation coater configured to coat an insulating material to allow the insulating material to cover a partial region of a coated part and a non-coated part in an electrode plate, along a boundary part between the coated part and the non-coated part, wherein the coated part has an electrode slurry coated thereon and the non-coated part does not have the electrode slurry coated thereon;
 an insulation-coating width measuring means configured to measure an overlay width and a non-coated part coating width, wherein the overlay width is a width of an overlay region where the insulating material is coated on the coated part and the non-coated part coating width is a width of a region where the insulating material is coated on the non-coated part;
 an insulation coater moving means configured to move the insulation coater; and
 a controller configured to compare the measured overlay width with a predetermined overlay width setting range or an overlay width reference value and control the insulation coater moving means based on the comparison,
 wherein the insulation coater moving means is controlled to move the insulation coater to a coated part side when the measured overlay width is less than the predetermined overlay width setting range, and to move the insulation coater to a non-coated part side when the measured overlay width exceeds the predetermined overlay width setting range, or wherein the insulation coater moving means is controlled to move the insulation coater to a coated part side when the measured overlay width is less than the overlay width reference value, and to move the insulation coater to a non-coated part side when the measured overlay width exceeds the overlay width reference value.

2. The insulation-coating overlay control system of claim 1, wherein the overlay width reference value is a median value corresponding to ½ of the predetermined overlay width setting range, and the insulation coater moving means is controlled by comparing a median value of the measured overlay width with a median value of the predetermined overlay width setting range.

3. The insulation-coating overlay control system of claim 1, wherein the insulation-coating width measuring means is a vision camera configured to visually sense the overlay width and the non-coated part coating width.

4. The insulation-coating overlay control system of claim 3, wherein the vision camera measures the overlay width and the non-coated part coating width by sensing at least one of color, contrast and chroma of the coated part or the non-coated part.

5. The insulation-coating overlay control system of claim 1, wherein the insulation coater moving means allows the insulation coater to be moved horizontally and vertically.

6. The insulation-coating overlay control system of claim 1, wherein the controller adjusts the overlay width by controlling a horizontal movement of the insulation coater moving means,
 wherein the adjusted overlay width is measured again by the insulation-coating width measuring means, and
 wherein it is determined whether to readjust the overlay width by comparing the remeasured overlay width with the predetermined overlay width setting range or the overlay width reference value.

7. The insulation-coating overlay control system of claim 1, wherein when the measured overlay width is within the predetermined overlay width setting range or coincides with the overlay width reference value, the insulation coater moving means is controlled to adjust the non-coated part coating width by comparing the measured non-coated part coating width with a predetermined non-coated part coating width setting range or non-coated part coating width reference value.

8. The insulation-coating overlay control system of claim 7, wherein the controller adjusts the non-coated part coating width by controlling a vertical movement of the insulation coater moving means,
 wherein the non-coated part coating width and the overlay coating width are remeasured by the insulation-coating width measuring means when the non-coated part coating width and the overlay coating width have been adjusted according to the vertical movement of the insulation coater moving means, and
 wherein it is determined whether to readjust the overlay width and the non-coated part coating width by comparing the remeasured overlay width with the predetermined overlay width setting range or the overlay width reference value and comparing the remeasured non-coated part coating width with the predetermined non-coated part coating width setting range or a non-coated part coating width reference value.

9. The insulation-coating overlay control system of claim 6, wherein when the remeasured overlay width is within the predetermined overlay width setting range or coincides with the overlay width reference value, the insulation coater moving means is controlled to adjust the non-coated part coating width by comparing the measured non-coated part coating width with a predetermined non-coated part coating width setting range or non-coated part coating width reference value.

10. The insulation-coating overlay control system of claim 9, wherein the controller is configured to adjust the non-coated part coating width by controlling a vertical movement of the insulation coater moving means,
 wherein the non-coated part coating width and the overlay coating width, are remeasured by the insulation coating width measuring means when the non-coated part coating width and the overlay coating width have been adjusted according to the vertical movement of the insulation coater moving means, and wherein it is determined whether to readjust the overlay width and the non-coated part coating width by comparing the remeasured overlay width with the predetermined overlay width setting range or overlay width reference value and comparing the remeasured non-coated part coating width with a predetermined non-coated part coating width setting range or a non-coated part coating width reference value.

\* \* \* \* \*